United States Patent [19]

Evans

[11] Patent Number: 5,743,580
[45] Date of Patent: Apr. 28, 1998

[54] HANDLE AND POST ASSEMBLY WITH A PLURALITY OF ATTACHMENTS

[76] Inventor: Steve C. Evans, 17741 Altamirano, Huntington Beach, Calif. 92647

[21] Appl. No.: 752,175

[22] Filed: Nov. 18, 1996

[51] Int. Cl.$^6$ ...................................................... A01B 1/20
[52] U.S. Cl. ................... 294/51; 7/114; 294/57; 294/59
[58] Field of Search ..................... 294/49, 51, 52, 294/54.5, 55, 57, 59; 7/114–116; 15/105, 111, 114, 117, 121, 145; 16/114 R; 56/400.01, 400.04, 400.05; 172/373–375

[56] References Cited

U.S. PATENT DOCUMENTS

| | | | |
|---|---|---|---|
| 1,530,225 | 3/1925 | Belakoy | 294/57 X |
| 1,818,917 | 8/1931 | Wolf | 15/114 |
| 2,347,963 | 5/1944 | O'Neill | 294/51 X |
| 2,639,454 | 5/1953 | Dory | 294/54.5 X |
| 4,162,132 | 7/1979 | Kress et al. | 172/375 X |
| 4,606,089 | 8/1986 | King | 294/51 X |
| 4,741,149 | 5/1988 | vom Braucke et al. | 294/51 X |
| 4,786,095 | 11/1988 | Dumont | 294/51 |

FOREIGN PATENT DOCUMENTS 330961   6/1930   United Kingdom ................... 294/49

Primary Examiner—Johnny D. Cherry

[57] ABSTRACT

A handle and post assembly with a plurality of attachments including a straight post with an elongated cylindrical configuration having a first lower end with a threaded periphery and a second upper end including a bore formed coaxially therein with a threaded inner surface. Further provided is a plurality of attachments each with a bore formed coaxially therein with a threaded inner surface for releasably engaging the threaded first end of the post. The attachments include a digging attachment, a raking attachment, and a sweeping attachment. Further provided is a handle with a T-shaped configuration having a straight horizontally oriented bar and a short vertically oriented bar integrally coupled at the first end thereof to a central extent of the horizontally oriented bar. The vertically oriented bar further has a second end with a threaded periphery for releasably engaging the threaded bore of the second end of the post.

3 Claims, 3 Drawing Sheets

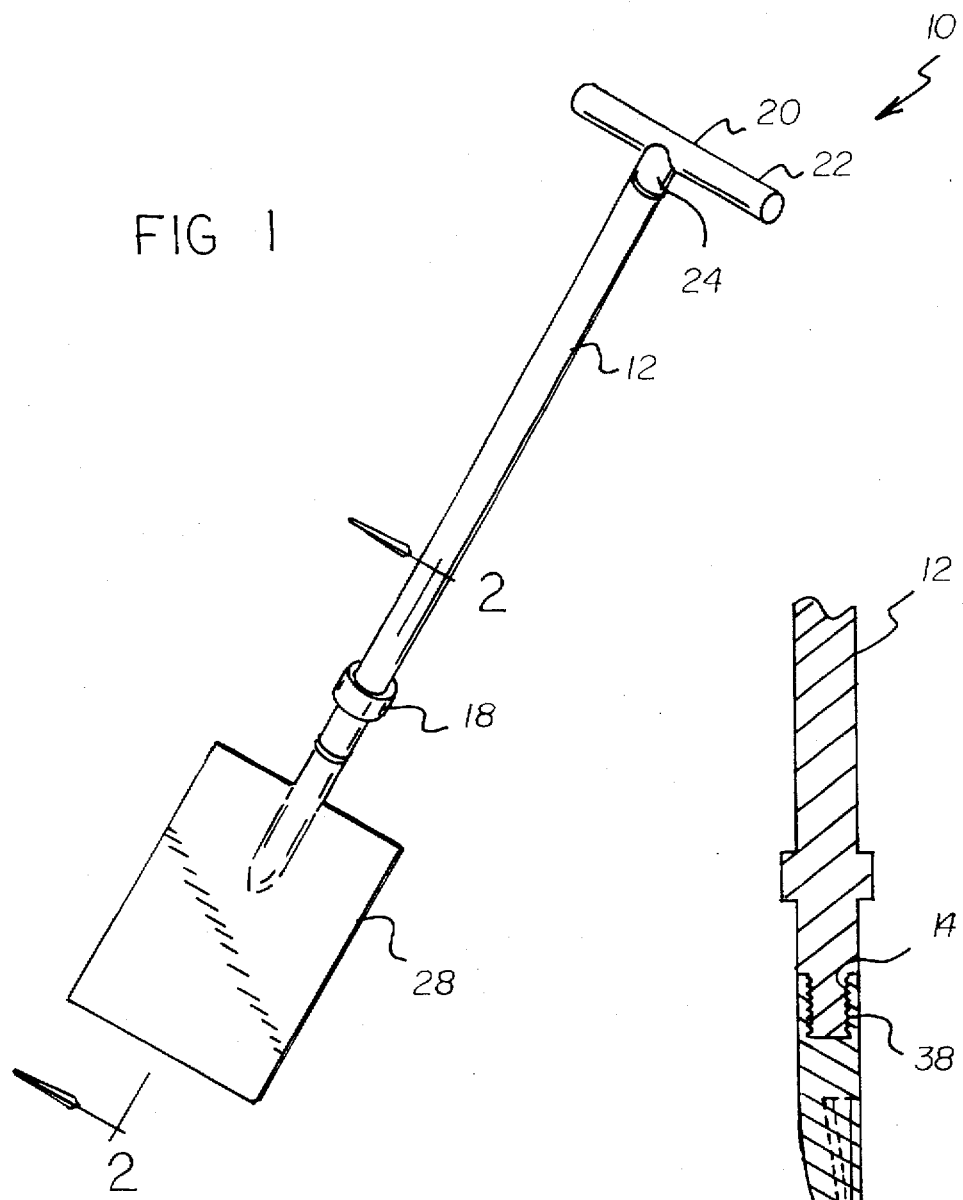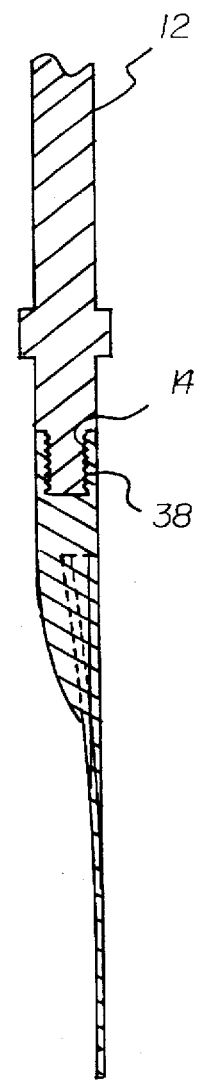
FIG 1
FIG 2

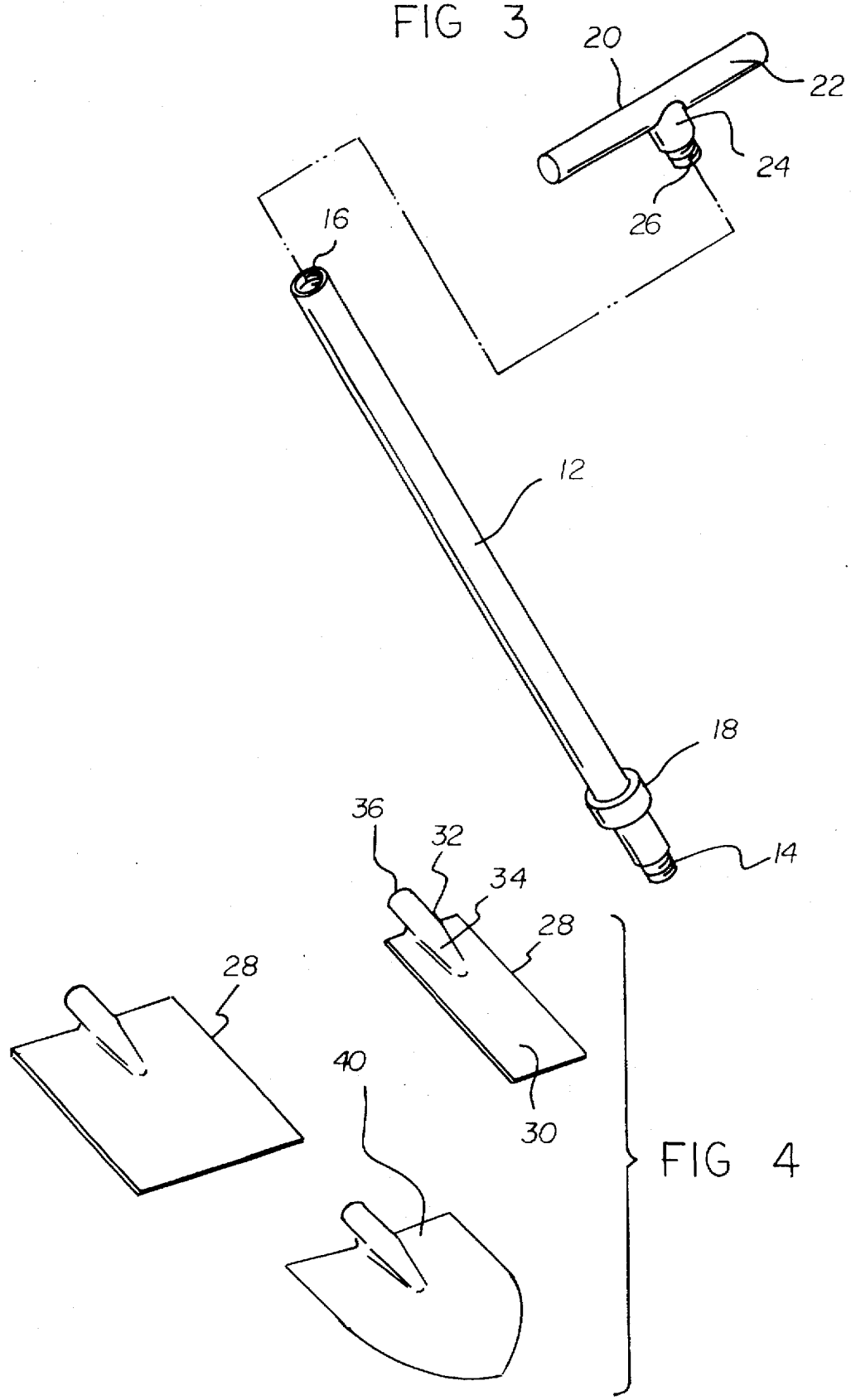

5,743,580

HANDLE AND POST ASSEMBLY WITH A PLURALITY OF ATTACHMENTS

BACKGROUND OF THE INVENTION

1. Field of the Invention

The present invention relates to a handle and post assembly with a plurality of attachments and more particularly pertains to attaching a plurality of tool attachments to an end of the post and further attaching a handle to an opposite end of the post if the specific attachments tool warrants its use.

2. Description of the Prior Art

The use of tools with replaceable handles is known in the prior art. More specifically, tools with replaceable handles heretofore devised and utilized for the purpose of replacing a broken handle are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,565,398 to Poulin; U.S. Pat. No. 4,476,939 to Wallace; U.S. Pat. No. Des. 347,557 to Schuele; U.S. Pat. No. 5,025,621 to DeMarco; U.S. Pat. No. 5,105,493 to Lugtenaar; and U.S. Pat. No. 4,741,149 to Vom Bracke et al.

In this respect, the handle and post assembly with a plurality of attachments according to the present invention substantially departs from the conventional concepts and designs of the prior art, and in so doing provides an apparatus primarily developed for the purpose of attaching a plurality of tool attachments to an end of the post and further attaching a handle to an opposite end of the post if the specific attachments tool warrants its use.

Therefore, it can be appreciated that there exists a continuing need for a new and improved handle and post assembly with a plurality of attachments which can be used for attaching a plurality of tool attachments to an end of the post and further attaching a handle to an opposite end of the post if the specific attachments tool warrants its use. In this regard, the present invention substantially fulfills this need.

SUMMARY OF THE INVENTION

In view of the foregoing disadvantages inherent in the known types of tools with replaceable handles now present in the prior art, the present invention provides an improved handle and post assembly with a plurality of attachments. As such, the general purpose of the present invention, which will be described subsequently in greater detail, is to provide a new and improved handle and post assembly with a plurality of attachments which has all the advantages of the prior art and none of the disadvantages.

To attain this, the present invention essentially comprises a straight post with an elongated cylindrical configuration. As shown in FIG. 3, the post has a first lower end with a threaded periphery and a second upper end including a bore formed coaxially therein with a threaded inner surface. Further included is an annular flange integrally formed adjacent the first lower end of the post for gripping purposes. Further provided is a cylindrical handle with a T-shaped configuration. The handle includes a straight horizontally oriented bar and a short vertically oriented bar integrally coupled at a first end thereof to a central extent of the horizontally oriented bar. A second end of the vertically oriented bar has a threaded periphery for releasably engaging the threaded bore of the second end of the post. Such removable nature of the bar allows its use only when the present invention is used for tasks wherein its needed. As shown in FIGS. 4-6, a plurality of attachments are included. Such attachments include a spade attachment formed of a rectangular plate which resides within a vertical plane. As shown in FIG. 4, the plate may be of various sizes. Also included is a rod having a first half integrally coupled to a central extent of the plate wherein the first half of the rod tapers toward the plate. The rod further has a second half coaxially coupled to the first half with a bore formed coaxially therein with a threaded inner surface for releasably engaging the threaded first end of the post. Further included as an attachment is a shovel formed of a generally rectangular plate with a triangular front portion. The shovel attachment further has a rod with a first half integrally coupled to a central extent of the plate, wherein the first half of the rod tapers toward the plate. The rod also includes a second half coaxially coupled to the first half. For releasably engaging the threaded first end of the post, a bore is formed coaxially in the second half with a threaded inner surface. As shown in FIG. 5, a broom attachment is included with a rectangular plate which resides in a horizontal plane. A plurality of vertically oriented bristles are each coupled at a top end thereof to a bottom surface of the plate. The broom attachment further includes a mounting plate coupled to a side edge of the rectangular plate and extended at a 45 degree angle with respect to a horizontal. The broom attachment further comprises a post with a first half integrally coupled to a central extent of the mounting plate. It should be noted that an axis about which the first half of the rod is formed also defines a 45 degree angle with the horizontal. The rod further includes a second half coaxially coupled to the first half. Similar to the prior attachments, a bore is formed coaxially therein with a threaded inner surface for releasably engaging the threaded first end of the post. Further provided is a squeegee attachment formed of a rectangular plate which resides in a vertical plane. A rubber strip is coupled at a top end thereof to a bottom edge of the plate in coplanar relationship therewith. The squeegee attachment further includes a mounting plate coupled to a side surface of the plate. Such mounting plate extends at a 45 degree angle with respect to a horizontal. The squeegee attachment further has a post with a first half integrally coupled to a central extent of the mounting plate wherein an axis about which the first half of the rod is formed also forms a 45 degree angle with the horizontal. The rod further has a second half coaxially coupled to the first half with a bore formed coaxially therein with a threaded inner surface for releasably engaging the threaded first end of the post. As shown in FIG. 6, a weighted rake attachment is formed of a rectangular container with an aperture for allowing water to be inserted therein. For precluding water from exiting the container during use, a cap is situated on a top surface of the container for being removably coupled over the aperture. The rake further has a plurality of vertically oriented teeth each coupled at a top end thereof to a bottom surface of the plate. A mounting plate is coupled to a side edge of the rectangular plate and extends at a 45 degree angle with respect to a horizontal. The rake attachment further has a post with a first half integrally coupled to a central extent of the mounting plate, wherein an axis about which the first half of the rod is formed also forms a 45 degree angle with the horizontal. The rod further has a second half coaxially coupled to the first half. A bore is formed coaxially therein with a threaded inner surface. As such, the weighted rake attachment may be releasably engaged with the threaded first end of the post. Finally, a plurality of rake attachments are included. See FIG. 6. Each rake has a mounting plate with a post having a first half integrally coupled to a central extent thereof. The rod further has a second half coaxially coupled to the first half. Similar to the prior attachments, a bore is formed coaxially therein with a threaded inner surface for releasably engaging the threaded first end of the post. Each rake attachment has a plurality of teeth coupled to the plate and extended therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved handle and post assembly with a plurality of attachments which has all the advantages of the prior art tools with replaceable handles and none of the disadvantages.

It is another object of the present invention to provide a new and improved handle and post assembly with a plurality of attachments which may be easily and efficiently manufactured and marketed.

It is a further object of the present invention to provide a new and improved handle and post assembly with a plurality of attachments which is of a durable and reliable construction.

An even further object of the present invention is to provide a new and improved handle and post assembly with a plurality of attachments which is susceptible of a low cost of manufacture with regard to both materials and labor, and which accordingly is then susceptible of low prices of sale to the consuming public, thereby making such handle and post assembly with a plurality of attachments economically available to the buying public.

Still yet another object of the present invention is to provide a new and improved handle and post assembly with a plurality of attachments which provides in the apparatuses and methods of the prior art some of the advantages thereof, while simultaneously overcoming some of the disadvantages normally associated therewith.

Still another object of the present invention is to attach a plurality of tool attachments to an end of the post and further attach a handle to an opposite end of the post if the specific attachments tool warrants its use.

Lastly, it is an object of the present invention to provide a new and improved handle and post assembly with a plurality of attachments including a straight post with an elongated cylindrical configuration having a first lower end with a threaded periphery and a second upper end including a bore formed coaxially therein with a threaded inner surface. Further provided is a plurality of attachments each with a bore formed coaxially therein with a threaded inner surface for releasably engaging the threaded first end of the post. The attachments include a digging attachment, a raking attachment, and a sweeping attachment. Further provided is a handle with a T-shaped configuration having a straight horizontally oriented bar and a short vertically oriented bar integrally coupled at a first end thereof to a central extent of the horizontally oriented bar. The vertically oriented bar further has a second end with a threaded periphery for releasably engaging the threaded bore of the second end of the post.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the handle and post assembly with a plurality of attachments constructed in accordance with the principles of the present invention.

FIG. 2 is a cross-sectional view of the present invention taken along line 2—2 shown in FIG. 1.

FIG. 3 is an exploded view of the post and handle of the present invention.

FIG. 4 is a perspective view of the plurality of digging devices of the present invention.

Similar reference characters refer to similar parts throughout the several views of the drawings.

DESCRIPTION OF THE PREFERRED EMBODIMENT

Figure 5:
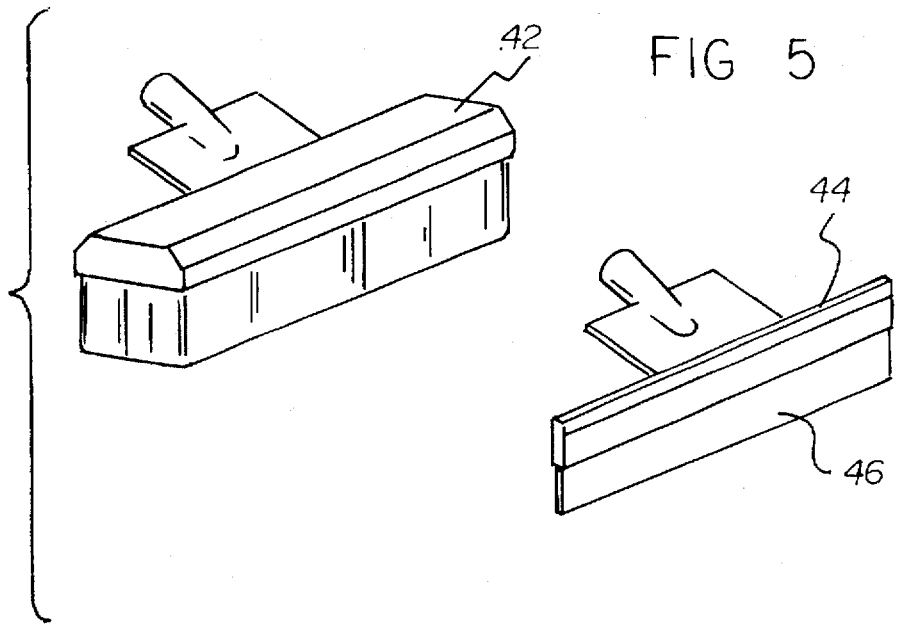
FIG. 5 is a perspective view of the plurality of sweeping devices of the present invention.

With reference now to the drawings, and in particular to FIG. 1 thereof, a new and improved handle and post assembly with a plurality of attachments embodying the principles and concepts of the present invention and generally designated by the reference numeral 10 will be described.

The present invention, the new and improved handle and post assembly with a plurality of attachments, is comprised of a plurality of components. Such components in their broadest context include a post, a removable handle, and a plurality of attachments. Such components are individually configured and correlated with respect to each other so as to attain the desired objective.

More specifically, it will be noted that the system 10 of the present invention includes a straight post 12 with an elongated cylindrical configuration. Preferably, the post has a length of approximately 51 inches and a diameter of approximately 1½ inches. As shown in FIG. 3, the post has a first lower end with a threaded periphery 14 and a second upper end including a bore 16 formed coaxially therein with a threaded inner surface.

Further included is an annular flange 18 integrally formed adjacent the first lower end of the post for gripping purposes.

Further provided is a cylindrical handle 20 with a T-shaped configuration. The handle includes a straight horizontally oriented bar 22 and a short vertically oriented bar 24 integrally coupled at a first end thereof to a central extent of the horizontally oriented bar. Ideally, the horizontally oriented bar is approximately ⅓ the length of the post. A second end of the vertically oriented bar has a threaded periphery 26 for releasably engaging the threaded bore of the second end of the post. Such removable nature of the handle allows its selective use only with attachments with which the handle is needed.

Figure 6:
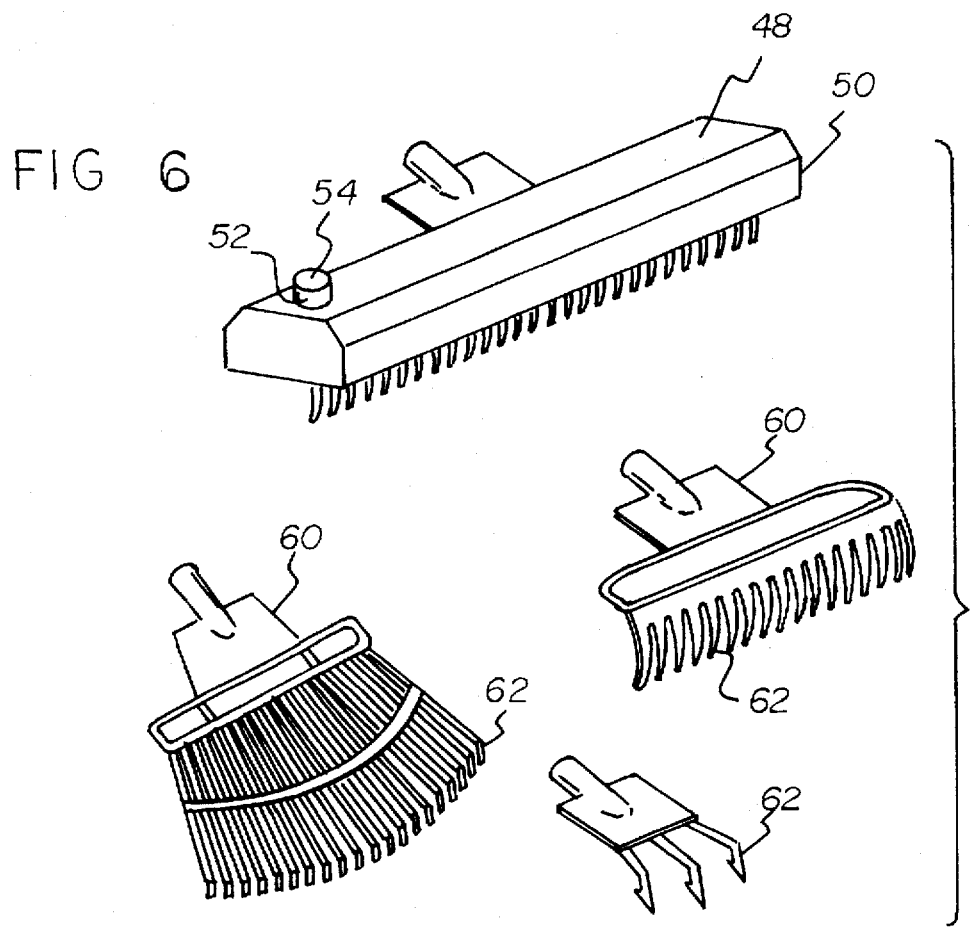
FIG. 6 is a perspective view of the plurality of raking devices of the present invention.

As shown in FIGS. 4–6, a plurality of attachments are included. Such attachments include a spade attachment 28 formed of a rectangular plate 30 which resides within a vertical plane. As shown in FIG. 4, the plate may be of various sizes. Also included is a rod 32 having a first half 34 integrally coupled to a central extent of the plate wherein the first half of the rod tapers toward the plate. The rod further has a second half 36 coaxially coupled to the first half with a bore formed coaxially therein with a threaded inner surface 38 for releasably engaging the threaded first end of the post. Ideally, the number of threads of the bores of both the handle and spade are such that the horizontal portion of the handle lies within the plane in which the spade resides.

Further included as an attachment is a shovel 40 formed of a generally rectangular plate with a triangular front portion. The shovel attachment further has a rod with a first half integrally coupled to a central extent of the plate, wherein the first half of the rod tapers toward the plate. The rod also includes a second half coaxially coupled to the first half. For releasably engaging the threaded first end of the post, a bore is formed coaxially in the second half with a threaded inner surface. Ideally, the number of threads of the bores of both the handle and shovel are such that the horizontal portion of the handle lies within the plane in which the shovel resides.

As shown in FIG. 5, a broom attachment 42 is included with a rectangular plate which resides in a horizontal plane. A plurality of vertically oriented bristles are each coupled at a top end thereof to a bottom surface of the plate. Such bristles ideally are composed of horse hair. The broom attachment further includes a mounting plate coupled to a side edge of the rectangular plate and extended at a 45 degree angle with respect to a horizontal. The broom attachment further comprises a post with a first half integrally coupled to a central extent of the mounting plate. It should be noted that an axis about which the first half of the rod is formed also defines a 45 degree angle with the horizontal. The rod further includes a second half coaxially coupled to the first half. Similar to the prior attachments, a bore is formed coaxially therein with a threaded inner surface for releasably engaging the threaded first end of the post.

Further provided is a squeegee attachment 44 formed of a rectangular plate which resides in a vertical plane. A rubber strip 46 is coupled at a top end thereof to a bottom edge of the plate in coplanar relationship therewith. The squeegee attachment further includes a mounting plate coupled to a side surface of the plate. Such mounting plate extends at a 45 degree angle with respect to a horizontal. The squeegee attachment further has a post with a first half integrally coupled to a central extent of the mounting plate wherein an axis about which the first half of the rod is formed also forms a 45 degree angle with the horizontal. The rod also has a second half coaxially coupled to the first half with a bore formed coaxially therein with a threaded inner surface for releasably engaging the threaded first end of the post.

As shown in FIG. 6, a weighted rake attachment 48 is formed of a rectangular container 50 with an aperture 52 for allowing water to be inserted therein. For precluding water from exiting the container during use, a cap 54 is situated on a top surface of the container for being removably coupled over the aperture. The rake further has a plurality of vertically oriented teeth each coupled at a top end thereof to a bottom surface of the plate. A mounting plate is coupled to a side edge of the rectangular plate and extends at a 45 degree angle with respect to a horizontal. The rake attachment further has a post with a first half integrally coupled to a central extent of the mounting plate, wherein an axis about which the first half of the rod is formed also forms a 45 degree angle with the horizontal. The rod further has a second half coaxially coupled to the first half. A bore is formed coaxially therein with a threaded inner surface. As such, the weighted rake attachment may be releasably engaged with the threaded first end of the post.

Finally, a plurality of rake attachments 60 are included. See FIG. 6. Each rake has a mounting plate with a post having a first half integrally coupled to a central extent thereof. The rod further has a second half coaxially coupled to the first half. Similar to the prior attachments, a bore is formed coaxially therein with a threaded inner surface for releasably engaging the threaded first end of the post. Each rake attachment has a plurality of teeth 62 coupled to the plate and extended therefrom. Each rake differs in the number and size of the teeth thereof.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A handle and post assembly with a plurality of attachments comprising, in combination:

a straight post with an elongated cylindrical configuration having a first lower end with a threaded periphery, a second upper end including a bore formed coaxially therein with a threaded inner surface, and an annular flange integrally formed adjacent the first lower end thereof;

a cylindrical handle with a T-shaped configuration having a straight horizontally oriented bar and a short vertically oriented bar integrally coupled at a first end thereof to a central extent of the horizontally oriented bar and having a second end with a threaded periphery for releasably engaging the threaded bore of the second end of the post; and a plurality of attachments including:

a spade attachment formed of a rectangular plate which resides within a vertical plane and a rod having a first half integrally coupled to a central extent of the plate wherein the first half of the rod tapers toward the plate, the rod further having a second half coaxially coupled to the first half with a bore formed coaxially therein with a threaded inner surface for releasably engaging the threaded first end of the post, a shovel attachment formed of a generally rectangular plate with a triangular front portion, the shovel attachment further having a rod with a first half integrally coupled to a central extent of the plate wherein the first half of the rod tapers toward the plate, the rod further having a second half coaxially coupled to the first half with a bore formed coaxially therein with a threaded inner surface for releasably engaging the threaded first end of the post, a broom attachment formed of a rectangular plate which resides in a horizontal plane having a plurality of vertically oriented bristles each coupled at a top end thereof to a bottom surface of the plate, the broom attachment further including a mounting plate coupled to a side edge of the rectangular plate and extending at a 45 degree angle with respect to a horizontal, the broom attachment further having a rod with a first half integrally coupled to a central extent of the mounting plate wherein an axis about which the first half of the rod is formed also forms a 45 degree angle with the horizontal, the rod further having a second half coaxially coupled to the first half with a bore formed coaxially therein with a threaded inner surface for releasably engaging the threaded first end of the post, a squeegee attachment formed of a rectangular plate which resides in a vertical plane having a rubber strip coupled at a top end thereof to a bottom edge of the plate in coplanar relationship therewith, the squeegee attachment further including a mounting plate coupled to a side surface of the plate and extending at a 45 degree angle with respect to a horizontal, the squeegee attachment further having a rod with a first half integrally coupled to a central extent of the mounting plate wherein an axis about which the first half of the rod is formed also forms a 45 degree angle with the horizontal, the rod further having a second half coaxially coupled to the first half with a bore formed coaxially therein with a threaded inner surface for releasably engaging the threaded first end of the post, a weighted rake attachment formed of a rectangular container with an aperture for allowing water to be inserted therein and a cap situated on a top surface thereof for being removably coupled over the aperture for precluding water from exiting the container during use, the weighted rake attachment having a plurality of vertically oriented teeth each coupled at a top end thereof to a bottom surface of the plate, the weighted rake attachment further having a mounting plate coupled to a side edge of the rectangular plate and extending at a 45 degree angle with respect to a horizontal, the rake attachment further having a rod with a first half integrally coupled to a central extent of the mounting plate wherein an axis about which the first half of the rod is formed also forms a 45 degree angle with the horizontal, the rod further having a second half coaxially coupled to the first half with a bore formed coaxially therein with a threaded inner surface for releasably engaging the threaded first end of the post, and a second rake attachment having a mounting plate with a rod having a first half integrally coupled to a central extent thereof, the rod further having a second half coaxially coupled to the first half with a bore formed coaxially therein with a threaded inner surface for releasably engaging the threaded first end of the post, wherein a plurality of teeth are coupled to the plate and extended therefrom.

2. A tool assembly with a plurality of attachments comprising:

a straight post with an elongated cylindrical configuration having a first lower end with a threaded periphery; and a plurality of attachments each with a bore formed coaxially therein with a threaded inner surface for releasably engaging the threaded first end of the post, the attachment including:

a digging means, a raking means, and a sweeping means;

wherein the sweeping means includes a broom attachment formed of a rectangular plate which resides in a horizontal plane having a plurality of vertically oriented bristles each coupled at a top end thereof to a bottom surface of the plate, the broom attachment further including a mounting plate coupled to a side edge of the rectangular plate and extending at a 45 degree angle with respect to a horizontal, the broom attachment further having a rod with a first half integrally coupled to a central extent of the mounting plate wherein an axis about which the first half of the rod is formed also forms a 45 degree angle with the horizontal, the rod further having a second half coaxially coupled to the first half with a bore formed coaxially therein with a threaded inner surface for releasably engaging the threaded first end of the post.

3. A tool assembly with a plurality of attachments comprising:

a straight post with an elongated cylindrical configuration having a first lower end with a threaded periphery; and a plurality of attachments each with a bore formed coaxially therein with a threaded inner surface for releasably engaging the threaded first end of the post, the attachment including:

a digging means, a raking means, and a sweeping means;

wherein the raking means includes a weighted rake attachment formed of a rectangular container with an aperture for allowing water to be inserted therein and a cap situated on a top surface thereof for being removably coupled over the aperture for precluding water from exiting the container during use, the weighted rake attachment having a plurality of vertically oriented teeth each coupled at a top end thereof to a bottom surface of the plate, the weighted rake attachment further having a mounting plate coupled to a side edge of the rectangular plate and extending at a 45 degree angle with respect to a horizontal, the rake attachment further having a rod with a first half integrally coupled to a central extent of the mounting plate wherein an axis about which the first half of the rod is formed also forms a 45 degree angle with the horizontal, the rod further having a second half coaxially coupled to the first half with a bore formed coaxially therein with a threaded inner surface for releasably engaging the threaded first end of the post.

* * * * *